United States Patent [19]

Höllerich

[11] 4,122,032

[45] Oct. 24, 1978

[54] DEFOAMING AGENT

[75] Inventor: August Höllerich, Kelheim, Fed. Rep. of Germany

[73] Assignee: PWA Papierwerke Waldhof-Aschaffenburg Aktiengesellschaft, Munich, Fed. Rep. of Germany

[21] Appl. No.: 782,710

[22] Filed: Mar. 30, 1977

[30] Foreign Application Priority Data

Mar. 31, 1976 [DE] Fed. Rep. of Germany ....... 2613810

[51] Int. Cl.$^2$ ............................................. B01D 19/04
[52] U.S. Cl. ..................................... 252/321; 252/358
[58] Field of Search ................................ 252/321, 358

[56] References Cited

U.S. PATENT DOCUMENTS

| 2,792,374 | 5/1957 | Bradley et al. ................... 252/321 X |
| 2,854,417 | 9/1958 | Edwards et al. ...................... 252/358 |
| 2,923,687 | 2/1960 | Jursich .............................. 252/358 X |

*Primary Examiner*—Benjamin R. Padgett
*Assistant Examiner*—E. Suzanne Parr
*Attorney, Agent, or Firm*—Burgess, Ryan and Wayne

[57] ABSTRACT

Defoaming agent comprising
 (a) from 1 to 100 parts by weight of at least one alkali-metal salt of an oxy-acid of sulphur, nitrogen or phosphorus,
 (b) from 20 to 1 parts by weight of at least one aliphatic hydrocarbon or a derivative thereof of the group consisting of fatty acids, fatty acid salts, fatty acid amides, alcohols, amines, aldehydes and ketones,
 (c) from 0 to 5 parts by weight, based on 100 parts by weight of (a + b), additives and
 (d) from 0 to 1000 parts by weight, based on 100 parts by weight of (a + b), water.

43 Claims, 3 Drawing Figures

U.S. Patent
Oct. 24, 1978
4,122,032
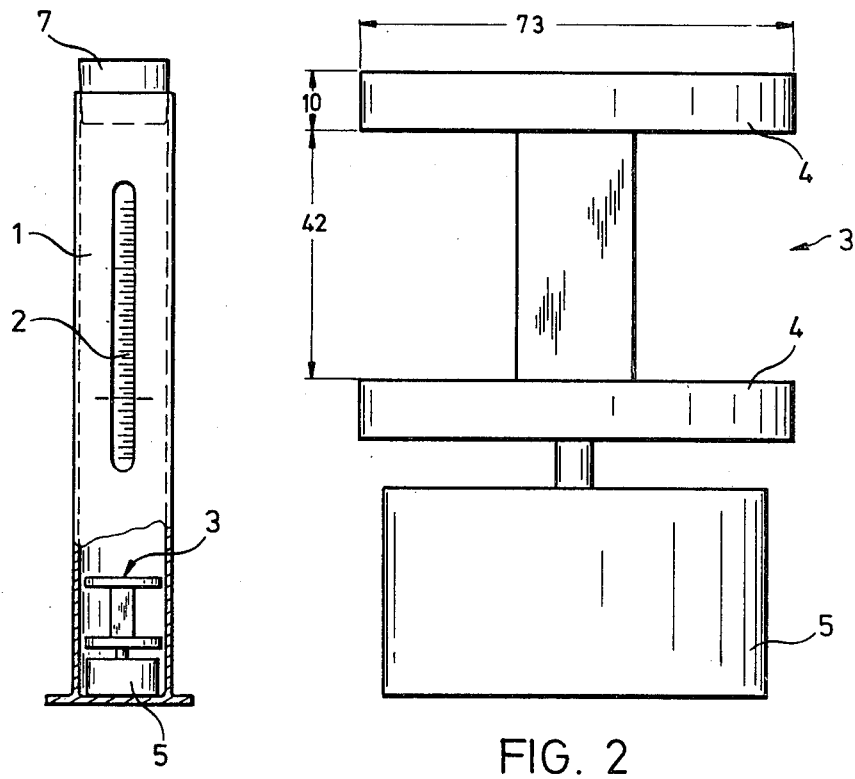
FIG. 1
FIG. 2
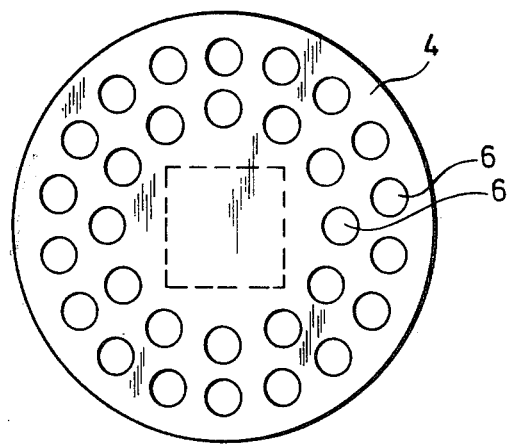
FIG. 3

DEFOAMING AGENT

FIELD OF THE INVENTION

This invention relates to defoaming agents. More particularly the invention relates to a defoaming agent comprising at least one alkali-metal salt of an oxy-acid of sulphur, nitrogen or phosphorus, and at least one aliphatic hydrocarbon or a derivative thereof of the group consisting of fatty acids, fatty acid esters, fatty acid salts, fatty acid amides, alcohols, amines, aldehydes and ketones.

BACKGROUND OF THE INVENTION

Foam control, particularly in effluents and backwater, gives rise to special problems in many areas, particularly in cellulose, paper and textile works.

In these industries, uniform production flow, for example in respect of pump output and the addition of chemicals, makes it essential that appropriate amounts of defoaming agents should be added to the backwater.

Defoaming agents for defoaming effluents and backwater are known commercially which are based on various classes of chemical compounds, for example alcohols, ketones, esters, soaps or emulsifiable mixtures of neutral and mineral oils.

Since considerable quantities of defoaming agents have to be added for foam control in effluents and backwater, with corresponding increased expenditure, it has long been required by industry that more effective and/or cheaper defoaming agents should be made available. Until now, however, such attempts have not had a sufficiently satisfactory result.

BRIEF DESCRIPTION OF THE DRAWINGS

FIG. 1 is an elevational view of an apparatus for testing foaming;

FIG. 2 is an elevational view, enlarged, of one part of the apparatus of FIG. 1; and FIG. 3 is a plan view of the part shown in FIG. 2.

SUMMARY OF THE INVENTION

Therefore, a first object of the invention is to provide novel defoaming agents suitable in foam control of effluents and backwater, in particular in the cellulose and paper production.

A second object of the invention is to provide more effective defoaming agents.

These and other objects and advantages will be apparent from the following description of the invention.

The objects of the present invention can be attained by a defoaming agent comprising
  (a) from 1 to 100 parts by weight of at least one alkali-metal salt of an oxy-acid of sulphur, nitrogen or phosphorus,
  (b) from 20 to 1 parts by weight of at least one aliphatic hydrocarbon or a derivative thereof,
  (c) from 0 to 5 parts by weight, based on 100 parts by weight of (a + b), additives and/or processing aids, and
  (d) from 0 to 1000 parts by weight, based on 100 parts by weight of (a + b), of water.

DETAILED DESCRIPTION OF THE INVENTION

Examples of suitable alkali-metal salts (a) are the lithium, sodium, potassium, rubidium, cesium or ammonium salts. The sodium and potassium salts are preferred, the sodium salts being particularly preferred in practice.

Examples of alkali-metal salts of sulphur oxy-acids suitable according to the invention are the alkali-metal salts of sulphurous acid, dithionous acid, thiosulphuric acid, pyrosulphuric acid, dithionic acid, pyrosulphurous acid, sulphoxyl acid or of other sulphur oxy-acis. The acidic salts, e.g. hydrogen sulphites, are also suitable, but sulphuric acid itself is unsuitable. With the hydrogen sulphites the less acidic salts are preferred compared to the stronger acidic salts.

The alkali-metal salts of sulphurous acid, i.e. the alkali-metal sulphites, are preferred, sodium sulphite being particularly preferred.

Suitable alkali-metal salts of nitrogen oxy-acids are, for example, the alkali-metal salts of nitric acid and nitrous acid, the latter being preferred and sodium nitrite being particularly preferred.

Alkali-metal salts of phosphorus oxy-acids suitable according to the invention are the alkali-metal salts of phosphoric acid ($H_3PO_4$ and $HPO_3$, respectively), phosphorous acid ($H_3PO_3$ and $HPO_2$, respectively), diphosphorous acid ($H_4P_2O_5$), hypophosphorous acid ($H_3PO_2$ and HPO, respectively), and of hypodiphosphorous acid ($H_4P_2O_6$). The acidic salts, e.g. hydrogen phosphites, are also suitable, the less acidic salts being preferred compared to the stronger acidic salts.

The alkali-metal salts of phosphorous acid, i.e. the alkali-metal phosphites, are preferred, sodium phosphite being especially preferred.

In the following for simplification the oxy-acids of sulphur, nitrogen and phosphorus, and the alkali-metal salts thereof, are named "oxy-acids" and "oxy-acid salts", respectively.

The defoaming agents of the invention may comprise as component (b) aliphatic saturated or unsaturated hydrocarbons having up to 60 carbon atoms, or derivatives thereof having up to 26 carbon atoms.

The derivatives of the aforesaid hydrocarbons may comprise fatty acids, fatty acid esters, fatty acid salts, fatty acid amides, alcohols, amines, aldehydes and ketones.

These derivatives are formally derived from the aforesaid hydrocarbons by substituting one or more hydrogen atoms by a suitable functional group whereby the incorporation of the functional group may occur in a terminal position as well as at carbon atoms in an internal position. It is preferred for the functional groups of the hydrocarbon derivatives to be in a terminal position, this, however, does not apply for the ketones.

According to the invention, the hydrocarbons are both saturated hydrocarbons and unsaturated hydrocarbons. The saturated hydrocarbons (paraffins) are preferred, the so-called paraffin oils being especially preferred.

According to the invention, the fatty acids used are both saturated fatty acids and unsaturated fatty acids. This also applies to the fatty acid residues contained in the fatty acid esters, salts or amides.

Suitable fatty acids according to the invention generally have 4 to 26 carbon atoms, preferably 7 to 18 carbon atoms, with fatty acids having 7 or 8 carbon atoms on the one hand and 15 to 18 carbon atoms on the other hand being especially preferred.

Special examples of suitable saturated fatty acids are butanoic acid (butyric acid), hexanoic acid (caproic acid), octanoic acid (caprylic acid), decanoic acid (capric acid), dodecanoic acid (lauric acid), tetradecanoic acid (myristic acid), hexadecanoic acid (palmitic acid), octadecanoic acid (stearic acid), eicosanoic acid (arachidic acid), docosanoic acid (behenic acid), tetracosanoic acid (lignoceric acid) or hexacosanoic acid (cerotic acid). Octanoic acid and stearic acid are preferred.

Special examples of suitable unsaturated fatty acids are $\Delta$-4,5-decenoic acid (obtusilic acid), $\Delta$-9,10-decenoic acid (caproleic acid), $\Delta$-4,5-dodecenoic acid (lauroleic acid), $\Delta$-5,6-tetradecenoic acid (physeteric acid), $\Delta$-9,10-tetradecenoic acid (myristoleic acid), $\Delta$-9,10-hexadecenoic acid (palmitoleic acid), $\Delta$-6,7-octadecenoic acid (petroselic acid), $\Delta$-9,10-octadecenoic acid (oleic acid), $\Delta$-11,12-octadecenoic acid (vaccenic acid), $\Delta$-9,10-eicosenoic acid (gadoleic acid), $\Delta$-11,12-eicosenoic acid, $\Delta$-11,12-docosenoic acid (cetoleic acid), $\Delta$-13,14-docosenoic acid (erucic acid), $\Delta$-15,16-tetracosenoic acid (selacholeic acid) or $\Delta$-17,18-hexacosenoic acid (ximenic acid).

Oleic acid, erucic acid and lauroleic acid are preferred.

Unsaturated fatty acids having two or more double bonds are also suitable. Special examples of these are $\Delta$-9,10-12,13-octadecadienoic acid (linoleic acid), -$\Delta$9,10-12,13-15,16-octadecatrienoic acid (linoleic acid), $\Delta$-9,10-11,12-13,14-octadecatrienoic acid (eleostearic acid), $\Delta$-9,10-11,12-13,14-15,16-octadecatetraenoic acid (parinaric acid), $\Delta$-5,6-8,9-11,12-14,15-eicosatetraenoic acid (arachidonic acid), $\Delta$-4,5-8,9-12,13-15,16-19,20-docosapentaenoic acid (clupanodonic acid) and $\Delta$-4,5-8,9-12,13-15,16-18,19-21,22-tetracosahexaenoic acid (nisinic acid).

Examples of suitable fatty acid esters according to the invention are the alkyl esters having 1 to 14 carbon atoms in the alkyl residue of the aforesaid saturated and unsaturated fatty acids, e.g. the methylethyl, butyl, lauryl and myristyl esters and the esters with polyhydric alcohols, such as ethylene glycol, glycerol, pentaerythritol and polyglycols. The glycerol esters and polyglycol esters are preferred.

Special examples of suitable glycerol esters are the naturally occuring animal and vegetable fats and oils such as butter, linseed oil, margarine, edible oils, such as corn oil or olive oil, rapeseed oil or coconut oil. This group of glycerol esters comprises as well the waste products obtained in large scale amounts, e.g. from oil raffination and the production of fatty acids, respectively. These waste products represent more or less contaminated, partially saponified fatty acid-glycerol ester compositions which have been used up to now, optionally in combination with emulsifiers, as defoaming agents (without using component (a)).

The polyglycol fatty acid esters are preferably ethoxylated and propoxylated fatty acids, the ethoxylated fatty acids being preferred. The alkoxy content (i.e. the number of alkoxide units, for example ethylene oxide units) is from 1 to 20, preferably 2 to 10, and especially 2 to 6, an alkoxylation degree of 3 and/or 4 leading to especially good results in practice. Polyglycol esters of oleic acid are preferred.

Examples of suitable fatty acid salts are alkali-metal and alkaline-earth salts, e.g. the lithium, sodium, potassium, magnesium, calcium or barium salts of the aforesaid saturated and unsaturated fatty acids. In practice, the alkali-metal salts, more particularly the sodium salts, are preferred.

Examples of suitable fatty acid amides are the amides of the aforesaid saturated and unsaturated fatty acids. Fatty acid amides having 4 to 22 carbon atoms, in particular 16 to 18 carbon atoms, are preferred.

Furthermore, suitable fatty acid amides according to the invention may have one or both hydrogen atoms at the nitrogen atom substituted by a lower alkanol radical, preferably an ethanol radical. Ethanol amides of natural saturated fatty acids, e.g. having 8, 10 or 14 carbon atoms, are preferred, lauric acid diethanolamide and the commercial products prepared from natural fatty acid mixtures and comprising a main part of lauric acid diethanolamide being especially preferred.

Examples of suitable alcohols according to the invention are saturated and unsaturated, aliphatic, monohydric and polyhydric alcohols. These generally have 1 to 22 carbon atoms, preferably 3 to 8 carbon atoms, and include n-alcohols, iso-alcohols and cyclic alcohols.

Special examples of suitable saturated aliphatic alcohols are methanol, ethanol, propanol, butanol, amylalcohol, hexyl alcohol, heptyl alcohol, octyl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, nonadecyl alcohol, arachyl alcohol, heneicosyl alcohol or behenic alcohol. Ethanol and amyl alcohol are preferred.

Special examples of unsaturated aliphatic alcohols are allyl alcohol, crotyl alcohol, propargyl alcohol, hexadecenyl alcohol, oleyl alcohol, elaidyl alcohol, eicosenyl alcohol, erucyl alcohol, geraniol and nerol.

Special examples of suitable polyhydric alcohols are ethylene glycol, propylene glycol, glycerol and pentaerythritol. Glycerol is preferred.

Examples of suitable amines according to the invention are the amines obtained by substituting the hydroxy group of the aforesaid monohydric, saturated or unsaturated alcohols by an amino group, such as methyl, ethyl and propyl amine etc.

Amines having 5 to 18 carbon atoms are preferred, stearyl amine and oleyl amine being especially preferred.

Amines being substituted at the amino group are also suitable. Preferred examples of such amines are N,N'-bis-(2-hydroxyethyl)-alkyl-($C_{12}$–$C_{18}$)-amines, bis-stearoyl-ethylene diamine and bis-palmitoyl-ethylene diamine.

Examples of suitable aldehydes according to the invention are the aldehydes corresponding to the aforesaid saturated and unsaturated fatty acids (formally being obtained by substituting the hydroxy group of the carboxy function by a hydrogen atom). It is to be noted, however, that some aldehydes are relatively instable.

Aldehydes having 5 to 12 carbon atoms are preferred, heptanal, buten-2-al-1 and 2-ethylenehexene-2-al-1 being especially preferred.

With the ketones such ketones having 6 to 9 carbon atoms are preferred, hexanone-3, diisopropyl ketone and isophorone (1.1.3-trimethyl-cyclohexene-3-one-5) being especially preferred.

In general those compounds are preferred as component (b) which are soluble and dispersable, respectively, in water, the soluble compounds being especially preferred. In the case of compounds which cannot be easily dispersed the defoaming agent is preferably added with usual dispersing agents, in the following being also named as emulsifiers.

The defoaming agents of the invention comprise from 1 to 100 parts by weight oxy-acid salts (a) to 20 to 1 parts by weight hydrocarbons or hydrocarbon derivatives (b), a ratio of from 3 to 40 parts by weight, in particular 10 to 20 parts by weight, component (a) to 1 part by weight component (b) being preferred.

The defoaming agents of the invention comprise from 0 to 5 parts by weight, preferably from 0 to 3 parts by weight, and in particular from 0 to 1 part by weight, additives and processing aids, based on 100 parts by weight (a + b).

Examples of suitable processing aids are emulsifiers, solubilizers and stabilizers. In many cases the presence of processing aids is not necessary, emulsifiers preferably being added in such cases where component (b) is only poorly emulsifiable in water. In practice the emulsifier is preferably added in an amount of from 0.1 to 0.5 percent by weight, based on (a + b).

Conventional compounds may be used as additives and processing aids, and suitable compounds may easily be selected by skilled persons.

The defoaming agents of the invention contain from 0 to 1000 parts by weight water, based on 100 parts by weight (a + b), the defoaming agents preferably being free of water. In some cases problems may arise when using water-free defoaming agents because the defoaming agents are generally diluted with water before use which might make it difficult to obtain homogenous solutions and emulsions, respectively, because of the poor solubility and emulsifiability of the component (b) in some cases. These problems can be substantially avoided by starting with a water-containing defoaming agent.

It follows from the aforesaid that it is preferred to keep the water content as low as possible. If water is necessary at all, in most cases a water content of not above 60 percent, preferably not above 40 percent, and in particular not above 20 percent, based on the total composition, will give satisfactory results in practice.

Thus, the defoaming agents of the invention preferably contain not more than 150 parts by weight, in particular not more than 67 parts by weight and most preferably not more than 25 parts by weight water, based on 100 parts by weight of (a + b).

The defoaming agents of the invention can be prepared by mixing component (a) with component (b), and, optionally, with components (c) and (d). In the absence of water it is preferred to charge the component (a) into a suitable mixing apparatus, e.g. a compulsary mixer, and then adding component (b). The component (c) may either be added together with component (b) or after the addition of component (b).

In the presence of water (d) the production of the defoaming agent is preferably carried out by charging the water into a suitable agitating apparatus and then adding components (a) and (b) as well as, optionally, component (c), optionally under slight heating.

Both in the absence of water and when using water an emulsifier in the above stated amounts is added to the defoaming agent in such cases where the component (b) is not easily dispersable in water.

In general, the defoaming agents of the invention are used in diluted form using water as diluent. This enables to achieve a more convenient dosage. The amount of the used defoaming agent depends on the specific defoaming agent used and on the medium to be defoamed, and can be determined by a simple experiment. The concentration of the diluted aqueous defoaming agent is not critical. However, in practice and in particular when using metering pumps, concentrations from about 1 to 10 percent by weight, in particular 3 to 5 percent by weight, based on (a + b) (plus, optionally, (c)) in the defoaming agent dispersion have proved to give desirable results. Concerning the use of the defoaming agent this means that the defoaming agent (containing water or not) is simply diluted with water until the desired concentration is reached.

The amount of defoaming agent to be used for foam control, based on the amount of the medium to be defoamed, is within the power of those versed in the art. Since the defoaming agents of the invention exceed the efficiency of known defoaming agents many times, for example up to a factor of 20, the amount to be used also decreases accordingly.

The invention also relates to a process for controlling foam by adding, either separately or in combination, an effective amount of
   (a) 1 to 100 parts by weight of at least one alkali-metal salt of an oxy-acid of sulphur, nitrogen or phosphorus, optionally in aqueous solution or dispersion,
   (b) 20 to 1 parts by weight of at least one aliphatic hydrocarbon or a derivative thereof, optionally in aqueous dilution or dispersion, and, optionally,
   (c) 0 to 5 parts by weight, based on 100 parts by weight (a + b), additives and/or processing aids to the medium to be defoamed.

The components (a), (b) and (c) are described above in detail.

The process of the invention is carried out by either adding the single components to the medium to be defoamed separately or by mixing the components before adding to the medium to be defoamed; the latter is preferred. When the components are mixed before the addition to the medium to be defoamed it is preferred to charge into a convenient stirred vessel a suitable amount of water and then adding the single components, optionally under slight heating. The use of the thus obtained defoaming agent is already described above.

The aforesaid concerning the amount of defoaming agent to be used applies for the separate addition of the single components as well.

The defoaming agent and the process for controlling foam of the invention are suitable for defoaming various acidic or alkaline industrial and domestic waste water. Industrial liquids from cellulose, paper, textile, yeast and spirits works, communal effluents and water made to foam by the addition of conventional substances such as domestic detergents, or curd soap, were investigated for this purpose. It was found that effective defoaming can be obtained in every case.

When adding the defoaming agents to the medium to be defoamed, the generally known requirements for use of defoaming agents are to be noted. Thus, for example, the defoaming agents should be added immediately before the point at which the forming of foam should be prevented. The best points for addition are places of high turbulence in the system.

The invention offers the following advantages:
1. The defoaming agent requirements are considerably reduced, for example up to a factor of 20.
2. Reduction of the amount of defoaming agent is accompanied by a reduction in pollution; both biological oxygen demand (BOD) and chemical oxygen demand (COD) are reduced in proportion to the reduced amount of defoaming agent.
3. In cellulose manufacture, a predetermined cellulose quality is obtained with a reduced amount of chemicals.

No special demands are made on the purity of components (a), (b) and (c), so that technical products can be used.

The present invention is further illustrated by reference to the following examples, however, the invention is not to be construed as being limited to these examples.

A graduated cylinder according to the figure is used for testing the defoaming activity.

The graduated cylinder 1 has a diameter of 74 mm, a height of 510 mm and a total volume of 2100 ml. The filling volume is 900 ml and can be read from a millimeter scale. The sink member 3 has two perforated plastic discs 4 connected to one another and an additional weight 5. The diameter of the sink member 3 is 73 mm, the thickness of the discs is 10 mm, and the space between the discs is 42 mm. The diameter of the bores 6 in the discs 4 (FIG. 3) is 6 mm, and the bores are evenly distributed over the discs. The volume (sink member 3 + additional weight 5) is 200 ml.

The additional weight 5 on one side of the member allows for a faster sinking of the sink member. The total weight of the member (sink member 3 + additional weight 5) is 1000 g. The space between the lower end of the cylinder 1 and a rubber stopper 7 in the upper opening of the cylinder defining the space of the member is 480 mm.

Preparation of the Foam

The liquid to be foamed is filled in up to the 50 mm mark (zero point). This volume includes the volume of the member (sink member + additional weight). When the graduated cylinder is turned around the member sinks down with strong turbulence and generation of foam, respectively. Immediately after the member having reached the boundary (rubber stopper at the upper side and the bottom of the cylinder, respectively) the cylinder is again turned around, i.e. the upper end and the lower side are interchanged. In one experiment the cylinder is turned around six times.

Determination of the Height of the Foam

After the last sinking of the member to the bottom of the cylinder the first reading ($S_1$) of the height of the foam is made within 10 to 15 seconds.

Determination of the Defoaming Activity

Immediately after the first reading ($S_1$) the defoaming liquid is added all at once. For better distribution the addition is made via a screening plate being held at a distance of ca. 10 cm above the foam. 15 Seconds after the addition the height of the collapsing foam is read. Further readings are made after 30, 45, 60, 90, 120, 150 and 180 seconds.

Preparation of the Standard Liquids 2.5 g. of a commercial ethoxylated oleic acid polyglycol ester (ethoxylation degree 3 to 4) are added with distilled water to make 250 ml. 4 ml of the thus obtained solution are added with 96 ml distilled water to make 100 ml. The resulting solution contains 0.04 g. oleic acid polyglycol ester (OPGE)/100 ml.

To 100 ml each of this standard OPGE solution the amount of component (a) stated in the following table is added. The solution or dispersion thus obtained is used as defoaming solution.

In the same manner as described above standard solutions having a composition as to be seen from the following table are prepared from other components (b). Then these standard solutions are added with the component (a) in the amount stated in the following table. The thus obtained liquids are used as defoaming liquids.

The results are to be seen from the following table. The stated percentage of foam decrease after the stated number of seconds is $$\frac{S_1 - S_2}{S_1} \cdot 100 \; (\%)$$

whereby $S_1$ denotes the foam height after the first reading (10 to 15 seconds after the last sinking of the foam-generating member), and $S_2$ is the foam height after the addition of the defoaming liquid at the time stated in the table.

It follows from the table that the invention provides a substantially increased defoaming action.

Table

| example | component (a) (g) | component (b) (g) | foam decrease (%) after 15 | 45 | 60 | 90 | 120 sec. |
|---|---|---|---|---|---|---|---|
| comp. example 1 | — | — | 21 | 42 | 48 | | 64 |
| comp. example 2 | — | OPGE, 0.04 g | 38 | | 65 | | 80 |
| 3 | sodium sulphite, 1 g | " | 72 | | 89–90 | | 89–90 |
| 4 | sodium nitrite, 0.4 g | " | 82 | | 93 | | 93 |
| 5 | sodium phosphite, 0.4 g | " | 83 | | 90 | | 90 |
| 6 | sodium nitrate, 1 g | " | 68 | | | | 97 |
| 9 | sodium sulphite, 1 g | oleic acid, 0.04 g | 84 | 97 | 100 | 100 | |
| comp. example 10 | — | " | 20 | | 20 | | 20 |
| 11 | sodium sulphite, 1 g | paraffin oil, 0.04 g | 56 | | | | 94 |
| comp. example 12 | — | " | 20 | | | | 20 |
| 13 | sodium sulphite, 1 g | petroleum ether, 0.04 g | 62 | | | | 85 |
| comp. example 14 | — | " | 20 | | | | 20 |
| 15 | sodium sulphite, 1 g. | { oleyl amine, 0.02 g. OPGE 0.02 g. } | 84 | | | 92 | 92 |
| comp. | | | | | | | |

Table-continued

| example | component (a) (g) | | component (b) (g) | | foam decrease (%) after 15 | 45 | 60 | 90 | 120 sec. |
|---|---|---|---|---|---|---|---|---|---|
| example 16 | — | | " | " | 25 | | | | 40 |
| 17 | sodium sulphite, | 1 g. | heptanone, | 0.02 g. | 88 | | | 95 | 95 |
| | | | OPGE | 0.02 g | | | | | |
| comp. example 18 | — | | " | " | 25 | | | | 50 |
| 19 | sodium sulphite, | 1 g. | heptanal | 0.04 g. | 88 | 91 | 91 | | |
| comp. example 20 | — | | " | " | 30 | | | | 35 |
| 21 | sodium sulphite, | 1 g. | heptanal | 0.02 g. | 96 | | | 99 | 99 |
| | | | oleic acid | 0.02 g. | | | | | |
| comp. example 22 | — | | " | " | 30 | 40 | | | 50 |
| 23 | sodium sulphite, | 1 g. | heptanal | 0.02 g. | 86 | | 93 | 93 | |
| | | | OPGE | 0.02 g. | | | | | |
| comp. example 24 | — | | " | " | 25 | 40 | | | 50 |
| 25 | sodium sulphite, | 1 g. | butyl stearate | 0.02 g. | 87 | | | | 92 |
| | | | OPGE | 0.02 g. | | | | | |
| comp. example 26 | — | | " | " | 40 | | | | 50 |
| 27+ | sodium sulphite, | 1 g. | glycerol monooleate | 0.02 g. | 75 | | | 90 | 90 |
| | | | stearic acid | 0.02 g. | | | | | |
| comp. example 28 | — | | " | " | 35 | 40 | | | 50 |
| 29 | same as example 3 but using textile effluent water | | | | 90 | 100 | 100 | | |

+addition of 0.6 ml ethanol and 4 ml emulgator solution (Eumulgin B2)

What is claimed is:

1. Defoaming agent comprising
   (a) from 1 to 100 parts by weight of at least one alkali-metal salt of an oxy-acid of sulphur, nitrogen or phosphorous selected from the group consisting of neutral or acidic alkali-metal salts of sulphurous acid, dithionous acid, thiosulphuric acid, pyrosulphuric acid, or of nitric acid or nitrous acid, or of phosphoric acid, phosphorous acid, diphosporous acid, hypophosphorous acid and hypodiphosphorous acid,
   (b) from 20 to 1 parts by weight of at least one aliphatic hydrocarbon having up to about 60 carbon atoms or a derivative thereof having up to 26 carbon atoms selected from the group consisting of fatty acids, a fatty acid ester, fatty acid salts, fatty acid amides, alcohols, amines, aldehydes and ketones,
   (c) from 0 to 5 parts by weight, based on 100 parts by weight of (a + b), an additive or processing aid, and
   (d) from 0 to 1000 parts by weight, based on 100 parts by weight of (a + b), water.

2. The defoaming agent of claim 1 wherein said alkali-metal salt (a) is sodium sulphite, sodium nitrite or sodium phosphite.

3. The defoaming agent of claim 1 wherein said aliphatic hydrocarbon (b) is an aliphatic, saturated or unsaturated hydrocarbon having up to about 60 carbon atoms.

4. The defoaming agent of claim 3 wherein said hydrocarbon is paraffin oil.

5. The defoaming agent of claim 1 wherein said fatty acid is a saturated fatty acid containing from 4 to 26 carbon atoms.

6. The defoaming agent of claim 5 wherein said saturated fatty acid is butyric acid, caproic acid, caprylic acid, capric acid, lauric acid, myristic acid, palmitic acid, stearic acid, arachidic acid, benhenic acid, lignoceric acid or cerotic acid.

7. The defoaming agent of claim 6 wherein said saturated fatty acid is caprylic or stearic acid.

8. The defoaming agent of claim 1 wherein said fatty acid is an unsaturated fatty acid containing from 4 to 26 carbon atoms.

9. The defoaming agent of claim 8 wherein said unsaturated fatty acid is obtusilic acid, caproleic acid, lauroleic acid, physeteric acid, myristoleic acid, palmitoleic acid, petroselic acid, oleic acid, vaccenic acid, gadoleic acid, cetoleic acid, erucic acid, ximenic acid, linolic acid, linoleic acid, eleostearic acid, parinaric acid, arachidonic acid, clupanodonic acid or nisinic acid.

10. The defoaming agent of claim 9 wherein said unsaturated fatty acid is oleic, erucic or lauroleic acid.

11. The defoaming agent of claim 1 wherein said fatty acid ester is a glycerol fatty acid ester.

12. The defoaming agent of claim 1 wherein said fatty acid ester is an alkoxylated fatty acid whereby the number of alkoxy units is from 1 to 20.

13. The defoaming agent of claim 12 wherein the number of alkoxy units is from 2 to 10.

14. The defoaming agent of claim 13 wherein the number of alkoxy units is from 2 to 6.

15. The defoaming agent of claim 12 wherein said fatty acid ester is an ethoxylated fatty acid.

16. The defoaming agent of claim 12 wherein said fatty acid ester is a polyglycol oleic acid ester.

17. The defoaming agent of claim 16 wherein said fatty acid ester is a polyethylene glycol oleic acid ester.

18. The defoaming agent of claim 1 wherein said fatty acid salt is an alkali-metal or an alkaline-earth metal salt.

19. The defoaming agent of claim 18 wherein said alkali-metal fatty acid salt is a sodium salt.

20. The defoaming agent of claim 1 wherein said fatty acid amide is derived from a saturated or unsaturated fatty acid containing from 4 to 26 carbon atoms.

21. The defoaming agent of claim 20 wherein said fatty acid contains from 4 to 22 carbon atoms.

22. The defoaming agent of claim 21 wherein said fatty acid contains from 16 to 18 carbon atoms.

23. The defoaming agent of claim 20 wherein said saturated fatty acid is butyric acid, caproic acid, caprylic acid, capric acid, lauric acid, myristic acid, palmitic acid, stearic acid, arachidic acid, behenic acid, lignoceric acid or cerotic acid.

24. The defoaming agent of claim 23 wherein said fatty acid amide is lauric acid diethanolamide.

25. The defoaming agent of claim 20 wherein said unsaturated fatty acid is obtusilic acid, caproleic acid, lauroleic acid, physeteric acid, myristoleic acid, palmitoleic acid, petroselic acid, oleic acid, vaccenic acid, gadoleic acid, cetoleic acid, erucic acid, ximenic acid, linolic acid, linoleic acid, eleostearic acid, parinaric acid, arachidonic acid, clupanodonic acid or nisinic acid.

26. The defoaming agent of claim 1 wherein said alcohol is a saturated or unsaturated, aliphatic, monohydric or polyhydric alcohol containing from 1 to 22 carbon atoms.

27. The defoaming agent of claim 26 wherein said alcohol has from 3 to 8 carbon atoms.

28. The defoaming agent of claim 26 wherein said alcohol is ethanol, amyl alcohol or glycerol.

29. The defoaming agent of claim 1 wherein said amine is derived from an unsaturated or saturated, aliphatic monohydric or polyhydric alcohol containing from 1 to 22 carbon atoms by substituting the hydroxy function by an amino function.

30. The defoaming agent of claim 29, wherein said amine contains from 5 to 18 carbon atoms.

31. The defoaming agent of claim 30 wherein said amine is stearyl amine or oleylamine.

32. The defoaming agent of claim 29 wherein said alcohol is ethanol, amyl alcohol or glycerol.

33. The defoaming agent of claim 1 wherein said aldehyde is derived from a saturated or unsaturated fatty acid containing from 4 to 26 carbon atoms by substituting the hydroxy group of the carboxy function by a hydrogen atom.

34. The defoaming agent of claim 33 wherein said aldehyde contains from 5 to 12 carbon atoms.

35. The defoaming agent of claim 34 wherein said aldehyde is heptanal, butene-2-al-1, or 2-ethylhexene-2-al-1.

36. The defoaming agent of claim 33 wherein said saturated fatty acid is butyric acid, caproic acid, caprylic acid, capric acid, lauric acid, myristic acid, palmitic acid, stearic acid, arachidic acid, behenic acid, lignoceric acid, or cerotic acid.

37. The defoaming agent of claim 33 wherein said unsaturated fatty acid is obtusilic acid, caproleic acid, lauroleic acid, physeteric acid, myristoleic acid, palmitoleic acid, petroselic acid, oleic acid, vaccenic acid, gadoleic acid, cetoleic acid, erucic acid, ximenic acid, linolic acid, linoleic acid, eleostearic acid, parinaric acid, arachidonic acid, clupanodonic acid or nisinic acid.

38. The defoaming agent of claim 1 wherein said ketone contains from 6 to 9 carbon atoms.

39. The defoaming agent of claim 38 wherein said ketone is hexanone-3, diisopropyl ketone or isophorone.

40. The defoaming agent of claim 1 wherein from 3 to 40 parts by weight, of component (a) are contained on 1 part by weight of component (b).

41. The defoaming agent of claim 40 wherein from 10 to 20 parts by weight of component (a) are contained on 1 part by weight of component (b).

42. Process for controlling foam by adding, either sequentially or in combination, an effective amount of
(a) 1 to 100 parts by weight of at least one alkali-metal salt of an oxy-acid of sulphur, nitrogen or phosphorus, selected from the group consisting of neutral or acidic alkali-metal salts of sulphurous acid. dithionous acid, thiosulphuric acid, pyrosulphurous acid or sulphoxylic acid, or of nitric acid or nitrous acid, or of phosphoric acid, phosphorous acid, diphosphorous acid, hypophosphorous acid and hypodiphosphorous acid,
(b) 20 to 1 parts by weight of at least one aliphatic hydrocarbon having up to 60 carbon atoms or a derivative thereof having up to 26 carbon atoms selected from the group consisting of fatty acids, a fatty acid ester, fatty acid salts, fatty acid amides, alcohols, amines, aldehydes and ketones, and
(c) 0 to 5 parts by weight, based on 100 parts by weight (a + b), of an additive or processing aid to the medium to be defoamed.

43. The process of claim 42 wherein said components (a) and (b) are in an aqueous solution or dispersion.

* * * * *

UNITED STATES PATENT OFFICE
CERTIFICATE OF CORRECTION

Patent No. 4,122,032　　　　　　　　　Dated October 24, 1978

Inventor(s) August Hollerich

It is certified that error appears in the above-identified patent and that said Letters Patent are hereby corrected as shown below:

Column 2, line 7:　"oxy-acis" should be --oxy-acids--.

Column 3, line 42:　"occuring" should be --occurring--.

Column 9, line 33:　"phosphorous" should be --phosphorus--.

line 48:　change "an additive" to --of an additive--.

line 67:　"benhenic" should be --behenic--.

Column 11, line 8:　Replace "23" by --20--.

Signed and Sealed this

Thirty-first Day of July 1979

[SEAL]

Attest:

Attesting Officer

LUTRELLE F. PARKER
Acting Commissioner of Patents and Trademarks